(12) United States Patent
Werde et al.

(10) Patent No.: US 6,647,927 B1
(45) Date of Patent: Nov. 18, 2003

(54) ANIMAL AMUSEMENT BUBBLE BLOWING METHOD AND SOLUTION

(75) Inventors: Neil J. Werde, Scottsdale, AZ (US); Martin J. Caveza, Redondo Beach, CA (US)

(73) Assignee: Farnam Companies, Inc., Phoenix, AZ (US)

( * ) Notice: Subject to any disclaimer, the term of this patent is extended or adjusted under 35 U.S.C. 154(b) by 0 days.

(21) Appl. No.: 10/154,540

(22) Filed: May 24, 2002

(51) Int. Cl.[7] .................... A01K 29/00; A63H 33/28
(52) U.S. Cl. ............................. 119/711; 446/15
(58) Field of Search ............... 119/707, 710, 119/711; 446/15, 16, 20; 426/104; D21/401, 402; D30/160

(56) References Cited

U.S. PATENT DOCUMENTS

| | | | |
|---|---|---|---|
| 3,818,627 A | * 6/1974 | Lebensfeld | 446/15 |
| 5,462,469 A | * 10/1995 | Lei | 446/15 |
| 5,542,869 A | 8/1996 | Petty | 446/16 |
| 5,704,821 A | 1/1998 | Mann | 446/16 |
| 5,797,353 A | * 8/1998 | Leopold | 119/711 |
| 5,857,431 A | * 1/1999 | Peterson | 119/710 |
| 5,879,218 A | 3/1999 | Tao | 446/15 |
| 6,056,983 A | 5/2000 | Broshi | 426/104 |
| 6,186,853 B1 | * 2/2001 | Messina | 446/15 |
| 6,241,571 B1 | 6/2001 | Chow | 446/18 |
| 6,303,164 B2 | * 10/2001 | Cottone et al. | 426/104 |

FOREIGN PATENT DOCUMENTS

EP 0 450 087 A1 * 10/1990 ............... 119/711

OTHER PUBLICATIONS www.worldwise.com, SmartyKat BubbleNip, 2003.*
www.kittycity.com, Catnip Blowing Bubbles, 2000–2003.*
www.sspca.org, Online Store, Kookamunga Catnip Treats, 2002–2003.*

* cited by examiner

Primary Examiner—Charles T. Jordan
Assistant Examiner—Elizabeth Shaw
(74) Attorney, Agent, or Firm—Kenyon & Kenyon

(57) ABSTRACT

A method of blowing scented bubbles for animal enjoyment comprising providing a scented bubble solution to wet a bubble arrangement, lifting the bubble arrangement to a bubble blowing position, blowing air from a blower through an interior area of the bubble arrangement producing scented bubbles, and lowering the bubble arrangement to be rewet.

23 Claims, 4 Drawing Sheets

ANIMAL AMUSEMENT BUBBLE BLOWING METHOD AND SOLUTION

FIELD OF THE INVENTION

The present invention relates to a method for animal/human amusement. More specifically, the invention relates to a method and solution which allows blowing of scented and/or flavored bubbles for amusement of an animal and the animal handler.

BACKGROUND INFORMATION

Throughout recorded time, humans have created toys to amuse domesticated animals. Numerous examples include rubber bones, balls or other similar devices. The devices have amused both humans and animals alike, encouraging a symbiotic relationship between the two. To encourage an animal's instinctive playful activity, designs of play objects often seek to fascinate and captivate an animal's attention.

Animals have a special affinity for unusual items and are easily fascinated by out of the ordinary objects. Bubbles, in particular, with their shimmering colors and floating nature naturally attract animals due to their peculiar abilities.

As animal handlers will easily testify to, animals naturally chase and attempt to bite bubbles, resulting in a playful display. After a few initial bites, however, the animal will stop chasing the bubbles, due to their soapy consistency and taste. Thus, the enjoyment for both animal and handler is short lived at best due to the shortcomings of the products used. Additionally, conventional bubble makers, such as wands, can be difficult to operate when coupled with certain bubble solutions. As a result, bubbles are infrequently generated and the enjoyment is limited.

Accordingly, there is a need for a method and solution for blowing scented and/or flavored bubbles which will encourage playful activity and not have the sensory shortcomings and potential health detriment when an animal bites the bubble.

SUMMARY

It is therefore an object of the present invention to provide a method to encourage the playful activity of animals.

It is also an object of the present invention to provide a method to produce bubbles with varying features for the playful activity.

It is also an object of the present invention to provide a solution for producing bubbles which is safe for play for both humans and animals.

These and other objects of the invention, which will become apparent from the following detailed description, are achieved as described. A method of blowing scented bubbles for animal enjoyment is described. The method comprises providing a scented bubble solution to wet a bubble arrangement. The method further comprises lifting the bubble arrangement to a bubble blowing position blowing air from a blower through an interior area of the bubble arrangement producing scented bubbles, and lowering the bubble arrangement to be rewet.

A further method of blowing scented bubbles for animal enjoyment is recited. This method comprises providing a scented bubble solution to wet a bubble arrangement, blowing air from a blower, lifting the bubble arrangement to a bubble blowing position such that the air from the blower is directed through an interior area of the bubble arrangement to produce scented bubbles for attraction of an animal, and lowering the bubble arrangement to be rewet.

A further method of blowing flavored bubbles for animal enjoyment is recited. This method comprises providing a flavored bubble solution to wet a bubble arrangement, lifting the bubble arrangement to a bubble blowing position, blowing air from a blower through an interior area of the bubble arrangement, producing flavored bubbles and lowering the bubble arrangement to be rewet.

A further method of blowing flavored bubbles for animal enjoyment is recited. The method comprises providing a flavored bubble solution to wet a bubble arrangement, lifting the bubble arrangement to a bubble blowing position, blowing air from a blower through an interior area of the bubble arrangement, producing flavored bubbles for attraction of an animal, and lowering the bubble arrangement to be rewet.

A still further method of blowing flavored bubbles for animal enjoyment is also described. The method entails providing a flavored bubble solution to wet a bubble arrangement, blowing air from a blower, lifting the bubble arrangement to a bubble blowing position such that the air from the blower is directed through an interior area of the bubble arrangement to produce flavored bubbles for attraction of an animal, and lowering the bubble arrangement to be rewet.

A solution for bubble production is also recited. The solution comprises a liquid substance configured to form a bubble when subjected to a volume of air when the liquid substance is placed upon a bubble arrangement, the liquid substance configured to be nontoxic and non-damaging to an animal when ingested, the liquid substance scented to attract the animal when the bubble is produced for animal play purposes.

A further solution for animal play is recited. This solution comprises a liquid substance configured to form a bubble when subjected to a volume of air when the liquid substance is placed upon a bubble arrangement, the liquid substance configured to be nontoxic and non-damaging to an animal when ingested, the liquid substance flavored to attract the animal for animal play purposes when the bubble is ingested.

DETAILED DESCRIPTION

Figure 1:
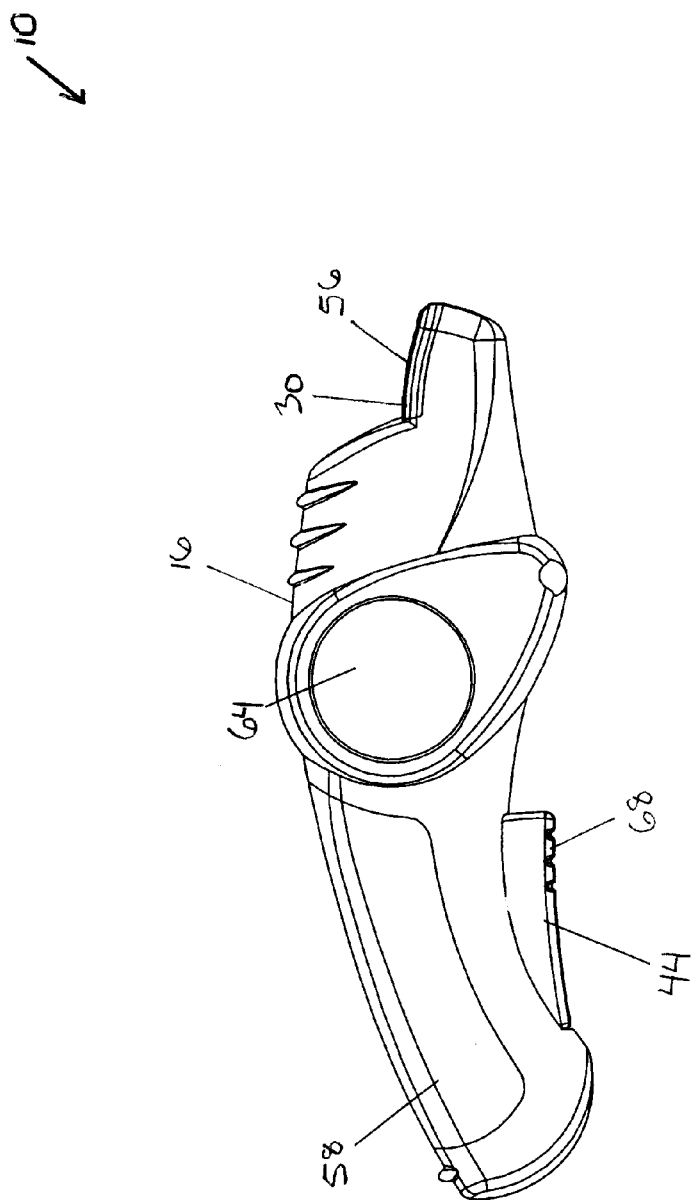
FIG. 1 illustrates an animal amusement manual bubble blowing apparatus in conformance with the present invention.

Referring to FIG. 1, a side view of a typical bubble blowing apparatus to be used for blowing scented and/or flavored bubbles for animal enjoyment is shown. The apparatus 10 has several components including a housing 16, a trigger arm 44, a solution tray depression 56 and a solution tray 30. The housing 16 may be comprised, referring to FIG. 4, of two parts, a left housing 20 and a right housing 22. In an example embodiment the left housing 20 and right housing 22 may be joined together through the use of screw 54 which allow for a positive connection between the left and right housings 20,22. Although the connection is shown as being established through screws 54, other configurations are possible such as, for example, gluing or tab and slot connectors. The housing 16 may be made of light weight materials, such as a synthetic plastic made from styrene by polymerization or copolymerization. The housing 16 may be made through an injection molding process, for example, or any other plastic shape forming method. The housing 16 may comprise an outer shell that defines a trigger arm opening 36, an air inlet opening 38 and an air outlet 62. Referring to FIG. 1, a label area 64 on the exterior surface of the housing 16 may allow fanciful or colored designs and/or logos to be attached to increase housing 16 eye appeal.

Figure 4:
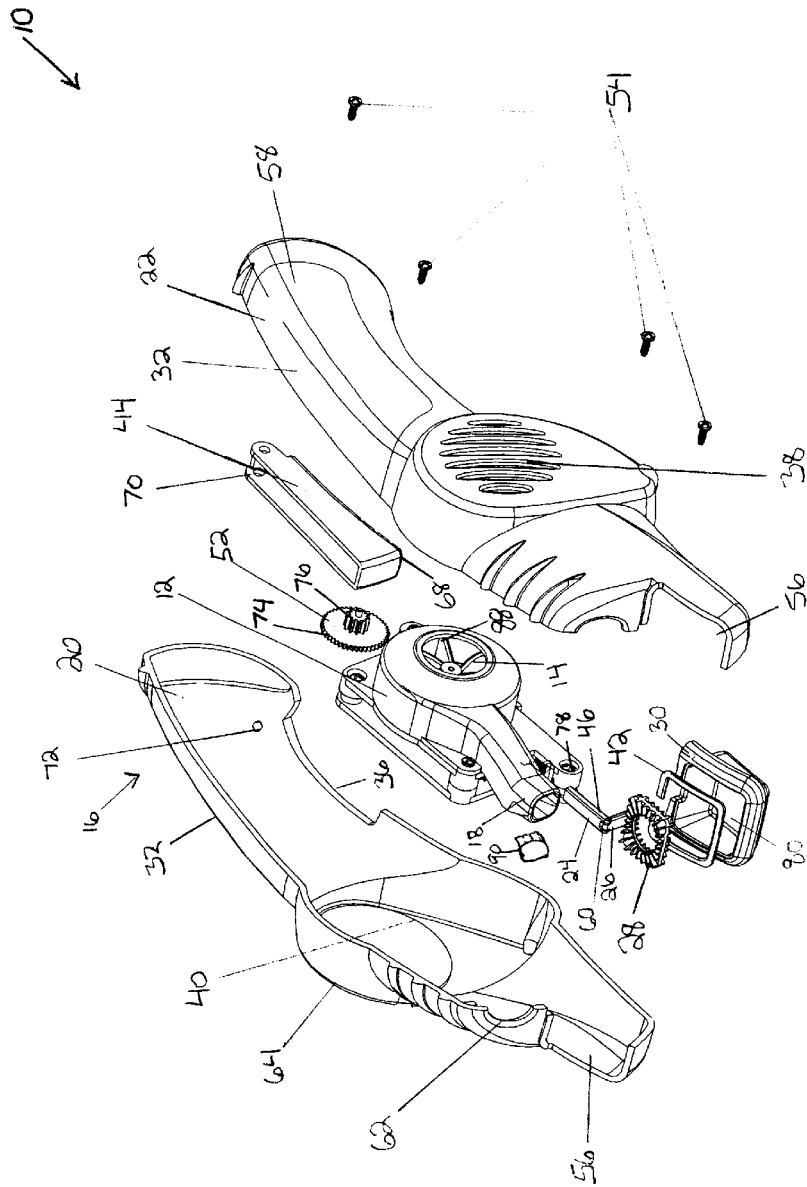
FIG. 4 illustrates an exploded view of the constituent parts of the animal amusement manual bubble blowing apparatus.

Referring to FIG. 4, a trigger arm 44 is placed in the trigger arm opening 36. The trigger arm 44 may allow mechanical actuation of the apparatus 10 through a squeezing motion or through other ways such as battery powered actuation. The trigger arm 44, maybe configured at the rear end to form a hinge 70. The hinge 70 may be formed through corresponding protrusions 72 in the housing 16. The trigger arm 44, in an example embodiment, has a trigger surface 68 which is formed during manufacturing of the arm 44. The trigger surface 68 may be textured, such as with ridges, to allow use of the arm 44 with minimum slippage. Although shown with ridges, it is not the intention to limit the surfaces to the example embodiment shown, and thus other configurations are possible.

The trigger arm 44 may be connected to a drive gear arrangement 52. The drive gear arrangement 52 may also be a mechanical connection or battery powered actuation or other actuation arrangement to a blower 12. Both the drive gear arrangement 52 and the blower 12 may be positioned in an interior volume 40 formed by the housing 16. The drive gear arrangement 52 has, for example, a set of gear teeth 74 and inner teeth 76. The inner teeth 76 may mechanically couple to the trigger arm 44 which in turn, through the set of gear teeth 74, enables the blower 12 to be actuated. As will recognized by those skilled in the art, the set of gear teeth 74 may mechanically couple to a mating set of teeth of the blower 12. The difference in circumference between the inner teeth 76 and the set of gear teeth 74 allows for mechanical advantage to be gained by the user enabling easier operation of the blower 12. The outer circumferences of the inner teeth 76 and the set of gear teeth 74 may be varied according to the operating requirements of the blower 12 and the desired squeeze strength for the trigger arm 44. The drive gear arrangement 52 may be manufactured from high impact plastic or other material to allow the proper sheer strength and lightness of weight for the arrangement 52.

The blower 12 allows a volume of air to be blown through a bubble arrangement 28 to produce scented bubbles. The blower 12 may be any type unit which allows an input of energy, both mechanical or electrical to be used to blow a volume of air through a neck 18 of the blower 12. The blower 12 is configured to blow air at a sufficient velocity and volume to produce scented bubbles from the apparatus 10 when the solution filled bubble arrangement 28 is placed in front of the neck 18. The blower 12 may be shaped such that the perimeter of the blower 12 snugly fits into the volume 40 created by the housing 16. Alternatively, the blower 12 may be connected to the housing 16 to allow for movement of the apparatus 10 without dislodgement of the blower 12 in the interior volume 40. The blower neck 18 may be configured such that air exiting the blower 12 is channeled to a predefined exit geometry. The predefined exit geometry may be used to control volume, velocity and pressure of air through the blower 12. As will be obvious to those skilled in the art, the neck 18 may be modified by a quick change insert 90 allowing the user to change the velocity of the exiting air.

The blower 12 may receive air through an air inlet 38 on the side of the housing 16. The air inlet 38 is sufficiently sized to minimize obstruction to air flow into the apparatus 10, while providing protection to the operator from the spinning fan 14 of the blower 12. The fan 14, may be constructed of a light weight material, such as plastic, to minimize initial inertial start up forces when the trigger arm 44 is squeezed. The movable blades 88 of the fan 14 may be configured such that the blades 88 of the fan 14 present a minimal hazard to the operator when in use.

Figure 3:
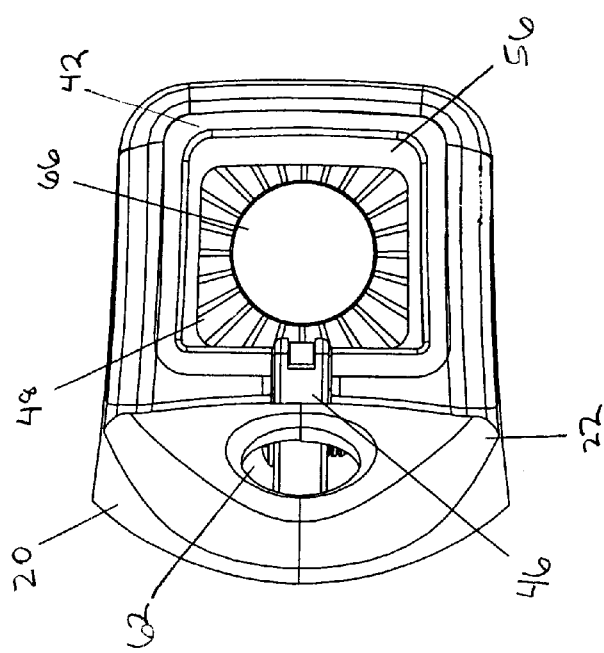
FIG. 3 illustrates an exploded top view of the bubble chamber of FIG. 2.

Referring to FIGS. 3 and 4, a bubble arrangement 28 may be connected to a vertical arm 26 which in turn is connected to a horizontal arm 24 through a connection 60. The bubble arrangement lifter 46, in the example embodiment, comprised of the arms 24 and 26, allows the bubble arrangement 28 to be lifted as a coherent unit. The bubble arrangement 28 may be configured in any geometry which allows retention of a solution film on an inner area 66 of the bubble arrangement 28. The bubble arrangement 28 may be configured in a number of differing geometries including oval or square for example. The bubble arrangement 28 may be provided with an appropriate thickness or ridges on the perimeter of the interior area 66 to allow proper bubble separation when a volume of air is directed at the inner area 66. The bubble arrangement 28 may be made of any material to provide light weight operation to increase efficiency of the bubble arrangement lifter 46. Although the vertical arm 26 and the horizontal arm 24 are configured as shown, the arms 24,26 may be replaced with other designs such as a single arm unit. The connector 60 may be a screw attachment, as an example, or any other appropriate connection type. The horizontal arm 24 connected to the blower 12 through a lifting connection 78. The lifting connection 78 may be configured such that the arm 24 is raised in response to a squeeze of the trigger arm 44. The lifting connection 78 may be established, for example, by a mechanical gear connection or other connection such as through battery operation. Other configurations, such as drive belts, are possible and the example embodiment shown should not be considered limiting. The bubble arrangement lifter 46 may be lifted to a bubble blowing position prior to operation of the blower 12 or after the initial start of the blower 12.

A solution tray 30 may be positioned inside the solution tray depression 56 formed by the housing 16. The solution tray 30 may be configured to allow the bubble arrangement 28 to enter and exit the solution tray 30 without interference. The depth of the solution tray 30 may be varied according to the amount of fluid that is desired to be retained. The solution tray 30 may be made of a chemical resistant material, such as styrene, for proper long-term operation. The edges of the solution tray 30 may be beveled such that no sharp edges exist around the exterior of the tray 30. The solution tray 30 may be held in position in the solution tray depression 56 through friction of the sides of the solution tray 30 and the housing 16. A solution tray top 42 may be positioned inside the solution tray 30 to provide an expansive force, creating friction between the depression 56 and the tray 30. The solution tray top 42 may thus be composed of a flexible material which will allow the top 42 to be installed in the cavity of the tray 30, and upon release, provide an expansive force.

Figure 2:
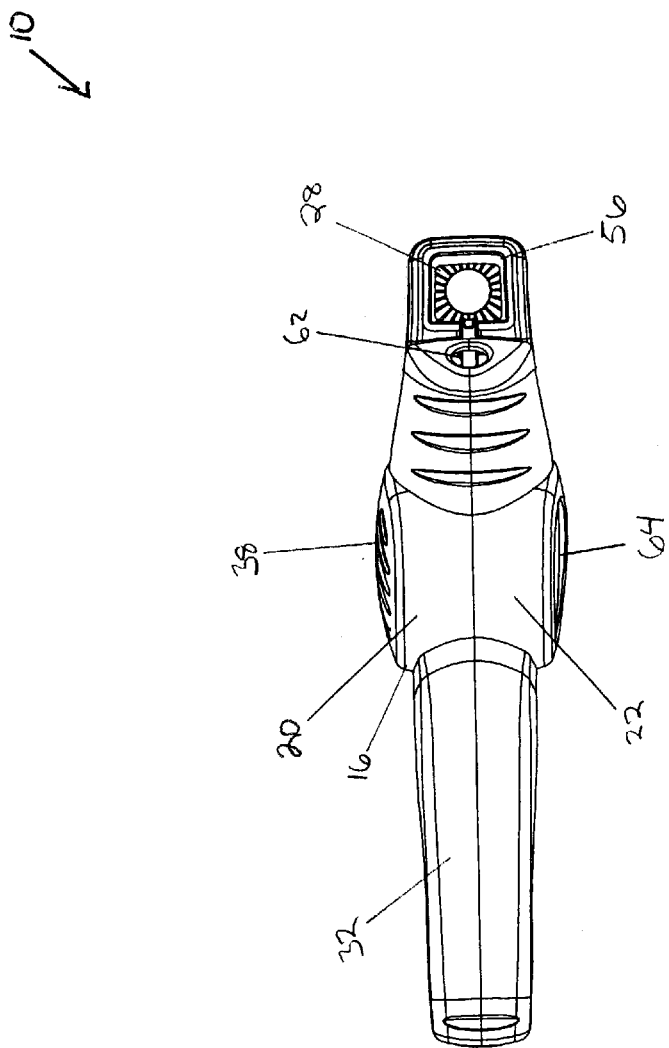
FIG. 2 illustrates a top view of the animal amusement manual bubble blowing apparatus.

Referring to FIGS. 2 and 4, the housing 16 may be configured with a housing grip 32 which allows easy handling of the apparatus 10. The grip 32 may be optionally provided with a no-skid surface to enhance gripping traction. The no-skid surface may include application of a rough contact paper or material. Alternatively the grip 32 may be formed with a textured surface to increase handling traction.

The scented bubble solution 80 is typically chosen to provide a sensory attraction capability for the animal which will be handled in conjunction with the apparatus 10. In the example case of a dog, the scented and/or flavored bubble solution may be configured to provide a steak, hot dog, peanut butter or other smell in which to attract the animal. In addition to smell, the bubble solution may be flavored to allow additional sensory attraction for an animal. Other scents and tastes may be used in conjunction with differing animals to provide appropriate attractive capabilities matched to differing animals. The scented bubble solution 80 may be provided such that the solution 80 is not harmful to the animals intended to play with the produced bubble. The solution 80 may be configured to be safe to ingestion and eye contact and non-toxic.

Operationally, a user acquires a scented bubble solution 80 and pours the solution 80 into the solution tray 30. The scented bubble solution 80 wets the bubble arrangement 28 and forms a film over inner area 66 of the arrangement 28. Keeping the apparatus 10 approximately level, the trigger arm 44 is squeezed. The rotation of the trigger arm 44 about the hinge 70 allows the trigger arm 44 to move the drive gear arrangement 52. The drive gear arrangement 52, in turn is mechanically connected to the fan 14 and the bubble arrangement lifter 46 such that the fan 14 of the blower 12 is placed in rotary motion. As will be apparent to those skilled in the art and in view of the above disclosure, actuation of the blower 12 and the fan 14 may be accomplished by mechanical and/or electrical ways and blowing of air may be accomplished prior to after the bubble arrangement is raised. The bubble arrangement lifter 46 is rotated to a bubble blowing position wherein the bubble arrangement 28 inner area 66 is positioned before the neck 18. A volume of air blown by the fan 14 of the blower 12 passes through the inner area 66 at such a volume and velocity to produce bubbles which are blown out the air outlet 62 of the apparatus 10. After movement of the trigger arm 44 has stopped, the bubble arrangement lifter 46 is returned to the solution tray 30 and rewetted by the scented bubble solution 80. As will be apparent to those skilled in the art, a bubble solution which is both scented and/or flavored may be used. The flavoring and/or scenting may be such that the animal intended to interact with the bubble solution is attracted by the features of the bubble. Additionally, differing types of apparatus may be used to create a bubble and therefore the application presented herein should not be considered limited by the example bubble blowing arrangement shown.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A method of blowing scented bubbles for animal enjoyment comprising:
   providing a scented bubble solution to wet a bubble arrangement;
   lifting the bubble arrangement to a bubble blowing position;
   blowing air from a blower through an interior area of the bubble arrangement producing scented bubbles for attraction of an animal; and
   lowering the bubble arrangement to be rewet.

2. The method of blowing scented bubbles according to claim 1, wherein the air from the blower is a continuous stream.

3. The method of blowing scented bubbles according to claim 1, wherein the air from the blower is an intermittent stream.

4. A method of blowing scented bubbles for animal enjoyment comprising:
   providing a scented bubble solution to wet a bubble arrangement;
   blowing air from a blower;
   lifting the bubble arrangement to a bubble blowing position such that the air from the blower is directed through an interior area of the bubble arrangement to produce scented bubbles for attraction of an animal; and
   lowering the bubble arrangement to be rewet.

5. The method of blowing scented bubbles according to claim 4, wherein the air from the blower is a continuous stream.

6. The method of blowing scented bubbles according to claim 4, wherein the air from the blower is an intermittent stream.

7. The method of blowing scented bubbles according to claim 4, wherein the bubbles are flavored.

8. A method of blowing flavored bubbles for animal enjoyment comprising:
   providing a flavored bubble solution to wet a bubble arrangement;
   lifting the bubble arrangement to a bubble blowing position;
   blowing air from a blower through an interior area of the bubble arrangement producing flavored bubbles for attraction of an animal; and
   lowering the bubble arrangement to be rewet.

9. The method of blowing flavored bubbles according to claim 8, wherein the air from the blower is a continuous stream.

10. The method of blowing flavored bubbles according to claim 8, wherein the air from the blower is an intermittent stream.

11. A method of blowing flavored bubbles for animal enjoyment comprising:
    providing a flavored bubble solution to wet a bubble arrangement;
    blowing air from a blower;
    lifting the bubble arrangement to a bubble blowing position such that the air from the blower is directed through an interior area of the bubble arrangement to produce flavored bubbles for attraction of an animal; and
    lowering the bubble arrangement to be rewet.

12. The method of blowing flavored bubbles according to claim 11, wherein the air from the blower is a continuous stream.

13. The method of blowing flavored bubbles according to claim 11, wherein the air from the blower is an intermittent stream.

14. The method of blowing scented bubbles according to claim 1, wherein the scented bubble solution is flavored.

15. The method of blowing scented bubbles according to claim 14, wherein the air from the blower is a continuous stream.

16. The method of blowing scented bubbles according to claim 14, wherein the air from the blower is an intermittent stream.

17. The method of blowing scented bubbles according to claim 14, wherein the bubbles are flavored and scented to simulate peanut-butter.

18. The method of blowing scented bubbles according to claim 14, wherein the bubbles are flavored and scented to simulate steak.

19. The method of blowing scented bubbles according to claim 14, wherein the bubbles are flavored and scented to simulate liver.

20. The method of blowing scented bubbles according to claim 14, wherein the bubbles are flavored and scented to simulate cat-nip.

21. A solution comprising a liquid substance configured to form a bubble when subjected to a volume of air when the liquid substance is placed upon a bubble arrangement, the liquid substance configured to be non-toxic and non-damaging to an animal when ingested, the liquid substance scented to attract the animal when the bubble is produced for animal play purposes.

22. The solution according to claim 21, wherein the substance is additionally flavored to attract the animal.

23. A solution comprising a liquid substance configured to form a bubble when subjected to a volume of air when the liquid substance is placed upon a bubble arrangement, the liquid substance configured to be non-toxic and non-damaging to an animal when ingested, the liquid substance flavored to attract the animal for animal play purposes when the bubble is ingested.

* * * * *